Oct. 15, 1963   J. D. ADAMS   3,107,031
LIQUID DISPENSING DEVICE AND METHOD
Filed July 22, 1960   2 Sheets-Sheet 2
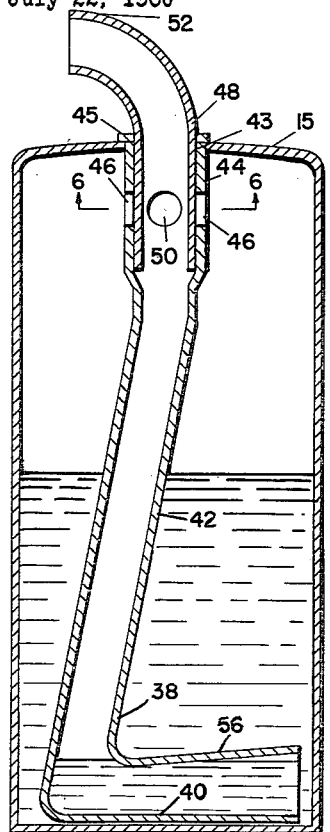
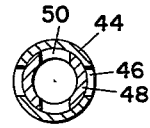
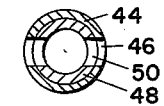
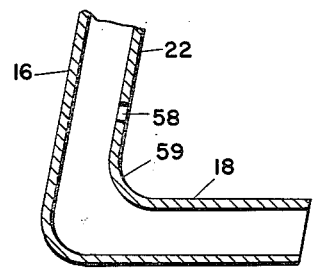
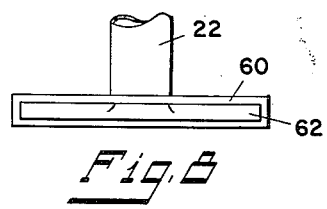
INVENTOR
JOHN DAVID ADAMS
BY
Joseph G. Werner
ATTORNEY

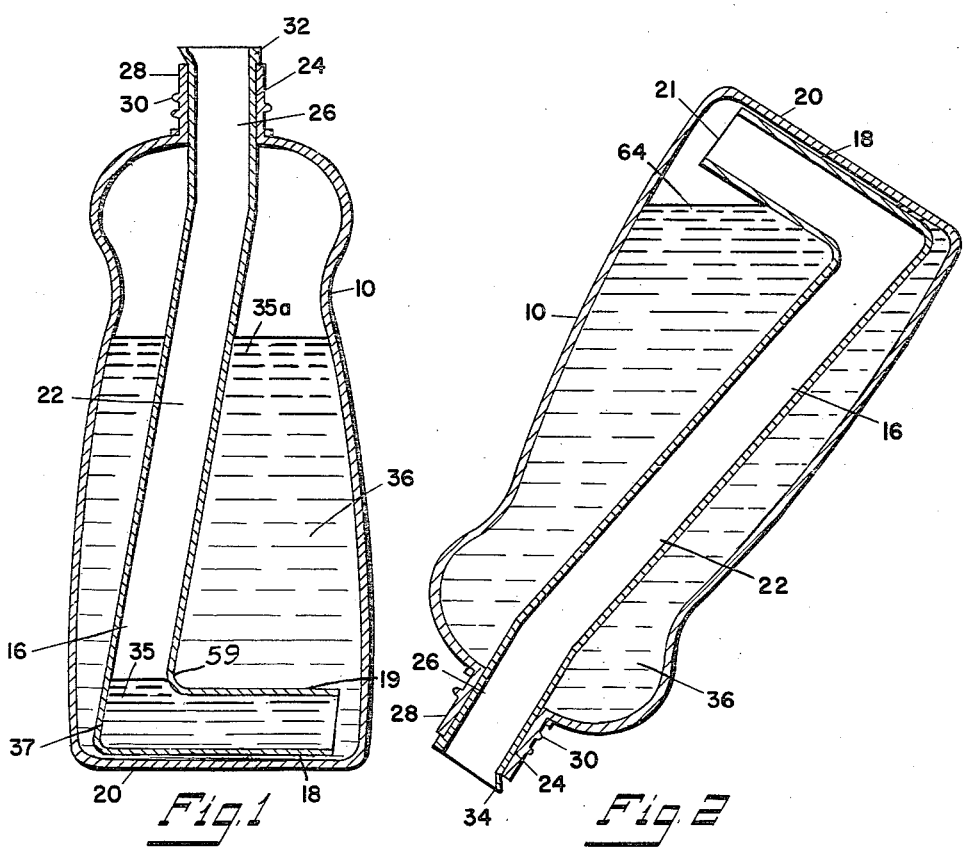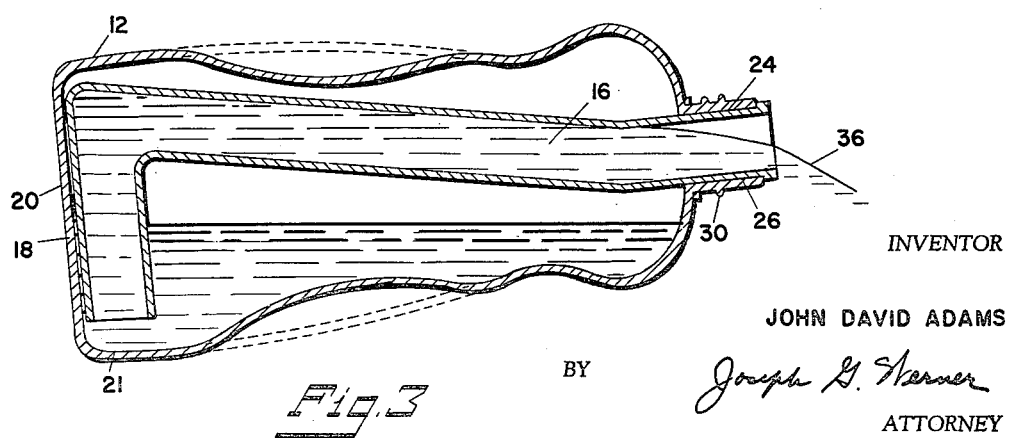

United States Patent Office 3,107,031
Patented Oct. 15, 1963

3,107,031
LIQUID DISPENSING DEVICE AND METHOD
John David Adams, 2816 Sylvan Ave., Madison, Wis.
Filed July 22, 1960, Ser. No. 44,652
5 Claims. (Cl. 222—1)

This invention relates to a liquid dispensing device and method.

It is an object of my invention to provide a liquid dispensing device which will dispense a predetermined amount of liquid from a container.

It is a further object of my invention to provide a liquid dispensing device which, as desired, will provide a substantially continuous flow of liquid or a measured amount of liquid from a container.

Another object of my invention is to provide a measuring liquid dispensing device which will dispense or use substantially all of the liquid from the container.

An additional object of my invention is to provide such a liquid dispensing device which is inexpensively and quickly installed in a container, and is easily adapted to mass production assembly methods.

An additional object of my invention is to provide a measuring liquid dispensing device that can be produced so inexpensively that it may be discarded with the container after the contents have been used.

A still further object of my invention is to provide a method for dispensing a measured amount of liquid from a container.

Other objects and advantages of the invention will be obvious from the following detailed description of one embodiment, and certain modification thereof, and the accompanying drawings, wherein:

FIG. 1 is a sectional view of a container in upright position with my device and liquid therein.

FIG. 2 is a sectional view similar to FIG. 1 with the container and my device shown in the position for dispensing a measured amount of liquid.

FIG. 3 is a sectional view similar to FIG. 1 showing the position and method for dispensing of a continuous flow of liquid.

FIG. 4 is a sectional view of a modified form of my device.

FIG. 5 is a sectional view of the modified form of FIG. 4 at lines 5—5 thereof.

FIG. 6 is a sectional view of the modified form of FIG. 4 with the spout member turned at a 90° angle at lines 6—6 of FIG. 4.

FIG. 7 is a sectional view of a modified form of a tube portion of my invention.

FIG. 8 is an end view of a modified form of a tube portion of my invention.

Liquid container 10 may be of the flexible type container 12, shown in FIG. 3, made of polyethylene or the like, or of the rigid metal type container 15 illustrated in FIG. 4. Tubing 16, which may be of semi-rigid or rigid material, has a base portion 18 substantially parallel to and adjacent to bottom 20 of the container 10. The body portion 22 of tubing 16 extends from the base portion 18 toward the container opening 24, which is at or near the top of the container. The opening 24 may be situated in the center, off-center or on the upper side of the container. The neck portion 26 of the tubing passes through the container opening and is sealed or otherwise maintained in substantially fluid-tight relation thereto. The neck 28 of the container may be provided with threads 30 for a conventional threaded cover (not shown), or other cover means may be provided. Neck portion 26 may extend over the top neck 28 of the container to form a seal rim 32. Neck portion 26 may also be provided with a spout 34, as shown in FIG. 2, to indicate the proper holding position of the container and to facilitate pouring of liquid 36. The tubing 16 should have sufficient rigidity to remain in position within the container as described above.

The modification shown in FIG. 4 is particularly adaptable to a rigid container 14, where it is desired to have a dispenser which is adjustable either for measured or continuous dispensing of liquids. In such modification, the tubing 38 has a base portion 40 substantially parallel to and adjacent to bottom 41 of container 15, a body portion 42, and a neck portion 44 which extends through container opening 43. The neck portion 44 has one or more apertures 46 and forms a collar around spout tubing 48. Spout tubing 48 has one or more apertures 50, which by swivel action of the spout tubing 48 within the neck portion 44 can when desired, be brought in communication with apertures 46 of the neck portion 44. The outer end 52 of spout tubing may be shaped to form a pouring spout. The neck portion 44 of tubing 38 is fitted in container opening 43 to provide a substantially fluid-tight seal between the container 15 and neck portion 44. A seal rim 45 may be provided around the container opening 43.

FIG. 4 shows another modification in the base portion 40 of tubing 38 with a taper in the upper side 56 of the base portion. This modification may also be applied to base portion 18 shown in FIGS. 1–3. FIG. 7 shows an additional modification in tubing 16, wherein an aperture 58 is placed at or near the juncture of body portion 22 and base portion 18. FIG. 8 shows a further modification of a base portion 60 joined to body portion 22 of tubing 16. As shown, the base portion 60 is flattened to provide a widened opening or slot 62.

In operation, the liquid 36 is placed in container 10. Tubing 16 is then inserted into the container opening 24 to provide a snug, substantially fluid-proof seal between the tube and the container opening 24. The neck portion 26 of tubing 16 may be slightly enlarged to ensure a good seal between the neck portion and the container. The base portion 18 and body portion 22 of tubing may have a slightly smaller diameter than opening 24 to facilitate insertion of the base and body portions. The liquid may be placed into the container after the tubing is placed therein, by providing a hole in the container for escape of air as the container is being filled with liquid, and then sealing the air-hole. In normal usage the level of the liquid 37 in tubing 16 when the container 10 is in upright position is at approximately the upper wall 19 of base portion 18, as shown in FIG. 1, by reason of the atmospheric pressure on the surface 35 of the liquid within the body portion 22 of tubing 16, and the substantial absence of pressure on the surface 35a of the liquid within the container.

When the container is tilted as shown in FIG. 2, the amount of liquid that was contained in the base portion 18 when the container was upright passes through body portion 22 and neck portion 26 in a measured quantity. The measured quantity, so poured out of the container, as stated, is the amount of liquid that was in the base portion 18 of tubing 16 when the container was in upright position as seen in FIG. 1. The measured amount may be increased or decreased by varying the length and/or the circumference of the base portion 18. As shown in FIG. 2 no liquid may enter base portion 18 after the container is tilted for pouring because the liquid level 64 is below the opening 21 of the base portion. Thus, substantially the same quantity is measured out each time the container is tilted in the direction shown in FIG. 2.

In order to facilitate the dispensing of substantially all of the liquid, as its level nears the bottom of the container, a widened and flattened base portion 60, as illustrated in FIG. 8, may be used.

If the container has a flexible body or sides, i.e., made of polyethylene or the like, the container may be turned 180° from the pouring position above described, with opening 21 facing downward. Then, by squeezing on the sides of the flexible container as shown in FIG. 3, the air pressure created thereby within the container forces the liquid 36 out through tubing 16 in a continuous flow. Thus, by merely changing the position of the container and squeezing its sides, my liquid measuring dispenser becomes a continuous flow dispenser, and vice versa.

The modification shown in FIG. 4 is particularly useful for easily converting a container with rigid sides from a measuring dispenser to a continuous flow dispenser. When the apertures 46 of neck portion 44 and apertures 50 of spout tubing 48 are not in communication the device acts as a liquid measuring dispenser, similar to that described above and shown in FIGS. 1 and 2. However, when spout tubing 48 is rotated within neck portion 44 so that apertures 46 and 50 are in communication, the liquid is permitted to flow continuously through apertures 46 and 50 through spout tubing 48, when the container 15 is held in inverted position. By simply turning spout tubing 48 so that the apertures 46 and 50 are no longer matching or communicative, the device again becomes a measuring dispenser of the amount of liquid contained in the base portion 40.

The modified form of base portion 40 in FIG. 4 has a tapered upper side 56 which permits the air within base portion 40 to be somewhat more readily displaced by liquid when it is filling with liquid. This feature may be used with the structure shown in FIGS. 1–3, also, but, in any case, is to be considered optional. The modification in FIG. 7 with aperture 58 in the tubing likewise facilitates to some extent the filling of base portion 18 with liquid, as the liquid may enter through aperture 58.

It is to be understood that the present invention is not confined to the particular construction, arrangement of parts or methods herein illustrated, but embraces all such modifications and alterations thereof, as may come within the scope of the following claims.

I claim:

1. A method for selectively dispensing measured quantities of liquid and a continuous flow of liquid, as desired, from a flexible-sided container having a section of tubing therein extending through a top opening in said container in sealed relation, said tubing having a body portion extending from said top opening to the bottom of said container adjacent one side wall thereof, and having a substantially straight base portion extending substantially parallel to the bottom of said container and having an open end located at a point adjacent a side wall of said container opposite the location of said body portion, comprising holding said container in an upright position until the base portion is substantially filled with a measured quantity of the liquid, tilting the container in a direction whereby the open end of the base portion extends above the level of the liquid in the container, tilting the container sufficiently to dispense the measured quantity of the liquid from the tubing, and placing the container in a tilted position whereby the open end of the base portion is submerged under the surface of the liquid, compressing the flexible sides of the container to produce sufficient air pressure upon the surface of the liquid to force a continuous flow of the liquid through the tube to dispense the liquid therefrom.

2. A liquid measuring dispenser adaptable for dispensing measured quantities of liquid and a continuous flow of liquid, as desired, comprising, a container having resilient sides which container is unvented except for a single upper opening, a section of unvented open-ended tubing inserted within said container and having a body portion extending from said upper opening to the bottom of said container adjacent one side wall thereof and a base portion extending from the lower extremity of said body portion in a direction substantially parallel with the bottom of the container and terminating at a point adjacent a side wall of said container opposite the location of said body portion lower extremity, which tubing extends upwardly from the body portion through said container opening in substantially fluid-proof, sealed relation with said container.

3. The invention of claim 2 wherein the base portion is flattened to provide a slot at its open end.

4. The invention of claim 2 wherein the quantity of liquid measured from the dispensing device is determined by the interior dimensions of the base portion of the tubing.

5. The invention of claim 2 additionally including an aperture in direct communication with the interior of the container in the tubing approximately where the upwardly extending portion of the tubing and the base portion of the tubing are joined.

References Cited in the file of this patent

UNITED STATES PATENTS

| 143,567 | Foster | Jan. 17, 1882 |
| 252,519 | Richter et al. | Oct. 14, 1873 |
| 532,990 | Rau | Jan. 22, 1895 |
| 900,644 | Von Baeyer | Oct. 6, 1908 |
| 1,049,339 | Byer | Jan. 7, 1913 |
| 1,952,558 | Miller | Mar. 27, 1934 |
| 2,022,031 | Fisher | Nov. 26, 1935 |
| 2,212,367 | Halsey | Aug. 20, 1940 |
| 2,233,996 | Dent | Mar. 4, 1941 |
| 2,465,023 | Leonard | Mar. 22, 1949 |
| 2,531,745 | Schopmeyer | Nov. 28, 1950 |
| 2,752,069 | Welsh | June 26, 1956 |
| 2,752,199 | Newell | June 26, 1956 |